United States Patent
Furusawa

(10) Patent No.: US 8,250,242 B2
(45) Date of Patent: Aug. 21, 2012

(54) FIELD BUS SYSTEM

(75) Inventor: Naoki Furusawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 6 days.

(21) Appl. No.: 12/959,260

(22) Filed: Dec. 2, 2010

(65) Prior Publication Data
US 2011/0137435 A1    Jun. 9, 2011

(30) Foreign Application Priority Data

Dec. 3, 2009 (JP) .................................. 2009-275352

(51) Int. Cl.
*G06F 3/00* (2006.01)
*G06F 13/00* (2006.01)
(52) U.S. Cl. .......... 710/5; 710/2; 710/8; 710/15; 710/65
(58) Field of Classification Search .................. None
See application file for complete search history.

(56) References Cited

U.S. PATENT DOCUMENTS
2007/0234339 A1   10/2007   Kostadinov

FOREIGN PATENT DOCUMENTS
| JP | 2005-122591 A | 5/2005 |
| KR | 10-2005-0043982 A | 5/2005 |
| WO | 01/14968 A1 | 3/2001 |
| WO | 2004/027541 A2 | 4/2004 |

OTHER PUBLICATIONS

Foundation Fieldbus Overview, Apr. 2007, Texas Instruments, [online, accessed on Jan. 28, 2012], URL: http://www.ni.com/pdf/manuals/370729b.pdf.*

* cited by examiner

*Primary Examiner* — Scott Sun
(74) *Attorney, Agent, or Firm* — McDermott Will & Emery LLP

(57) ABSTRACT

A controller is provided with a first memory area and a second memory area, where a pre-update software is stored with the first memory area as the active area and an updated software is downloaded with the second memory area as an inactive memory area. A microprocessor for simulations performs a simulation of the control of the operation of a field device using the updated software that has been downloaded. The execution status of the simulation can be monitored using a host computer. If the evaluation result of the state of execution of the simulation by an operator is "Pass," then an activate command is sent to the controller. As a result, the active/inactive are switched in the controller.

5 Claims, 12 Drawing Sheets

Prior Art

Prior Art

FIELD BUS SYSTEM

CROSS REFERENCE TO RELATED APPLICATIONS

The present application claims priority under 35 U.S.C. §119 to Japanese Patent Application No. 2009-275352, filed Dec. 3, 2009, which is incorporated herein by reference.

FIELD OF THE TECHNOLOGY

The present invention relates to a field bus system for controlling a transmitting device for temperature, pressure, flow rate, or like, and a field device, such as a valve operating device, using a controller.

BACKGROUND OF THE INVENTION

Conventionally, this type of field bus system has been provided with a host computer, a controller that is connected through a communication line to the host computer, and a field device that is controlled by the controller, where software for controlling the field device is downloaded from the host computer to the controller.

FIG. 11 illustrates the structure of the critical components in a conventional field bus system. In the drawing: 1 is a host computer; 2 is a controller; and 3-1 through 3-$n$ are field devices; wherein the host computer and the controller are connected through a general-use communication line 4, and the controller 2 and the field device 3 (3-1 through 3-$n$) are connected through a link module 5. Note that in this field bus system, the communication line 6 wherein the controller 2 and the field device 3 are connected through the link module 5 is known as a field bus.

In the controller 2 in the field bus system, software is used for controlling the operation of the field device 3. This controller 2 uses this software to read in an input value (a measured value) from the field device 3, to calculate, from the input value that has been read in, an actual value for a control output to the field device 3, and to send, to the field device 3, the actual value (the output value) for the control output that has been calculated. The operation of the field device 3 is controlled by the controller 2 thereby.

When there is an update to the software that is used in the controller 2, the updated software is sent to the controller 2 through the communication line 4 from the host computer 1, to be downloaded to the controller 2. In this case, until the updated software is activated, the controller 2 is in an idle state, and the control of the field device 3 is stopped.

In this type of software updating method, there is no major problem in processes/modes wherein the controller 2 can be stopped. However, this type of software updating method cannot handle a situation wherein one does not wish to stop the process control even though one wishes to update the software.

In contrast, one may consider using a method such as disclosed in International Publication WO2001/014968 ("WO '968") or Japanese Unexamined Patent Application Publication 2005-122591 ("JP '591") in order to perform the updating of the software without stopping the process control through downloading the updated software to the controller 2.

In this method, as illustrated in FIG. 12, for example, a first memory area M1 and a second memory area M2 are provided in a controller 2 that is provided with a microprocessor 2-1 and a communication interface 2-2, and software S1 prior to the update is downloaded into the first memory area M1. Furthermore, an active/inactive switching portion 2-3 is provided in the controller 2, where, as the active/inactive switching states, the first memory area M1 is the active memory area and the second memory area M2 is the inactive memory area.

As a result, the microprocessor 2-1 uses the pre-update software S1, which is stored in the active memory area M1, to control the operation of the field device 3.

When there is a software update, the updated software S2 is loaded into the second memory area (the inactive memory area.) M2, and once the download has been completed, then the second memory area M2 is switched to the active memory area and the first memory area M1 is switched to the inactive memory area by the active/inactive switching portion 2-3.

As a result, the microprocessor 2-1 uses the updated software S2, which has been downloaded, to start control of the operation of the field device 3 immediately following the conclusion of the downloading of the updated software to the second memory area M2.

However, in the method wherein the two memory areas are used, as set forth above, between downloading and switching the active/inactive states there is no technique for validating the validity of the updated software that has been downloaded, so the updated software is used without the validity being validated, and thus there has been the risk that there will be a problem in control.

The present invention is to solve this type of issue, and the object thereof is to provide a field bus system wherein it is possible to validate, prior to the active/inactive switching, the validity of the downloaded software after updated software is downloaded.

SUMMARY OF THE INVENTION

The present invention, in order to achieve this object, is a field bus system for downloading, from a host computer to a controller, software for controlling the operation of a field device, having a host computer, a controller that is connected through a communication line to the host computer, and a field device controlled by the controller, wherein the controller includes first and second memory areas provided as memory areas for software installation; active/inactive switching means for receiving an activate command from the host computer to switch either the first or the second memory area to be an active memory area and to switch the other to be an inactive memory area; field device operation controlling means for controlling the operation of the field device using the software that is stored in the active memory area: downloading means for downloading, to the inactive memory area, updated software sent from the host computer; and simulating means for simulating the control of operation of the field device using the updated software that is downloaded into the inactive memory area; and wherein the host computer has updated software sending means for sending updated software to the controller; monitoring means for monitoring the state of execution of the simulation using the updated software in the controller; and activate command sending means for sending an activate command to the controller.

In the present invention, the controller controls the operation of the field device using software that is stored in the active memory area, and simulates control the operation of the field device using updated software that has been downloaded into the inactive memory area. In this case, the state of execution of the simulation using the updated software that has been downloaded can be monitored by the host computer.

Here if a pass/fail evaluation result regarding the status of the execution of the simulation that is monitored is "Pass," for example, then an activate command is sent to the controller from the host computer. When this is done, then, in the controller, the memory area that had been inactive to this point is switched to become the active memory area, and the memory area that has been active to this point is switched to become the inactive memory area.

Doing so makes it possible to commence control of the operation of the field device using the updated software after validation, on the host computer side, of the validity of the updated software that has been downloaded, after downloading the updated software to the inactive memory area. In this case, the pre-update software that is stored in the active memory area is used in the period of time up until the active/inactive switching is performed, to continue the control of the operation of the field device.

Given the present invention, the controller is provided with simulating means for simulating the control of the operation of the field device using the updated software that has been downloaded to the inactive memory area, and the host computer is provided with monitoring means for monitoring the status of execution of the simulation using the updated software in the controller, thus making it possible to validate, on the host computer side, the validity of the updated software that has been downloaded to the controller, prior to the active/inactive switching, making it possible to prevent the use, by the controller, of updated software as-is, prior to validity validation.

DETAILED DESCRIPTION OF THE INVENTION

Figure 1:
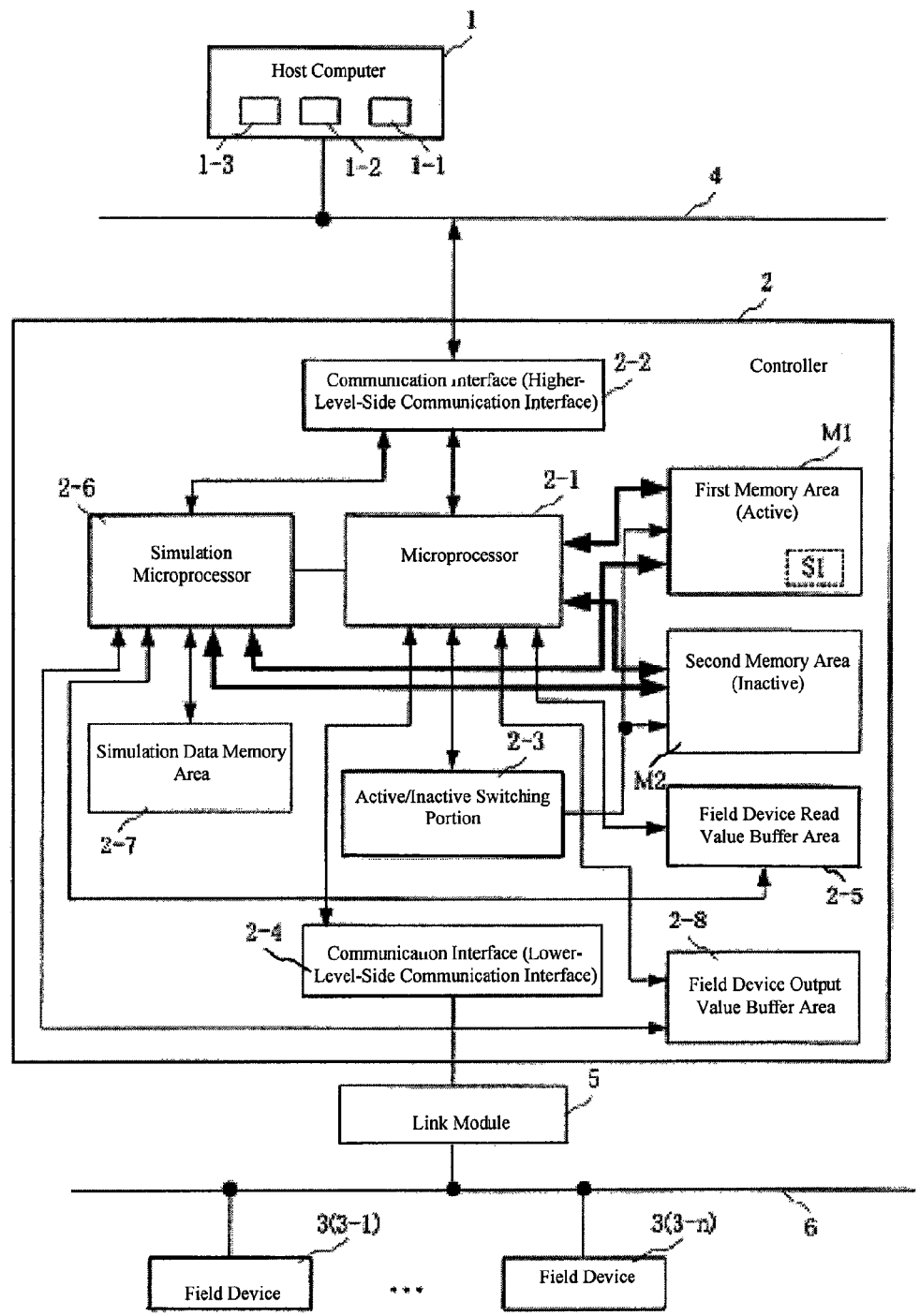
FIG. 1 is a diagram illustrating the critical components of an example of a field bus system.
Figure 11:
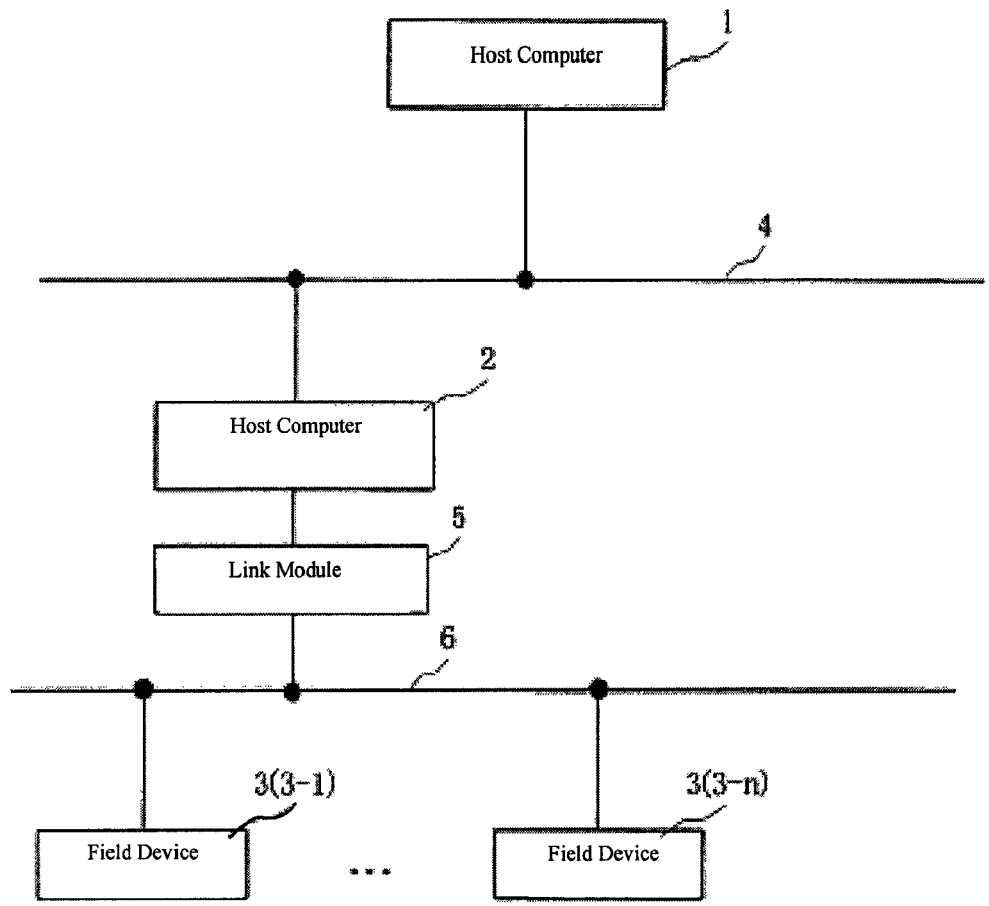
FIG. 11 is a diagram illustrating the configuration of critical components of a conventional field bus system.
Figure 12:
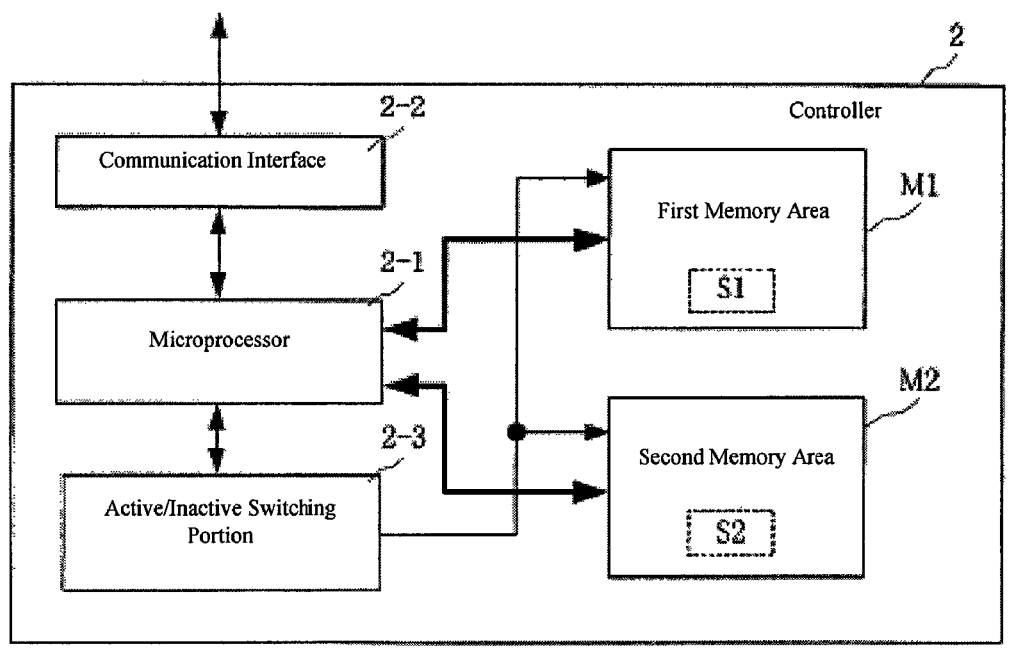
FIG. 12 is a diagram illustrating the configuration of critical components in the controller in the case of performing a download of updated software using the methods such as illustrated in WO '968 and JP '591.

A form for embodying the present invention will be explained in detail below based on the drawings. FIG. 1 is a diagram illustrating the critical components of an example of a field bus system. In this figure, codes that are identical to those in FIG. 11 and FIG. 12 indicate identical or equivalent structural elements as the structural elements described for FIG. 11 in FIG. 12, and explanations thereof are omitted.

In the present form, the controller 2 includes a microprocessor 2-1; a communication interface (a higher-level-side communication interface) 2-2; an active/inactive switching portion 2-3; a communication interface (a lower-level-side communication interface) 2-4; a field device read value buffer area 2-5; a simulation microprocessor 2-6; a simulation data memory area 2-7; a field device output value buffer area 2-8; a first memory area M1; and a second memory area M2.

Note that while in the present example two microprocessors are provided, that is, the microprocessor 2-1 and the simulation microprocessor 2-6, if the microprocessor 2-1 is powerful, then the microprocessor 2-1 may be given the functions of the simulation microprocessor 2-6. Additionally, in terms of the active/inactive switching portion 2-3 as well, the microprocessor 2-1 may be given that function as well.

The host computer 1 has an updated software sending portion 1-1; a monitoring portion 1-2, and an activate command sending portion 1-3. Note that the host computer 1 is achieved through hardware, such as a processor, a memory device, and the like, and a program that achieves a variety of functions in cooperation with these hardware, and, as illustrated in FIG. 1, as distinctive functions that are possessed by the host computer 1, there are only the updating software sending portion 1-1, the monitoring portion 1-2, and the activate command sending portion 1-3.

In this field bus system, the pre-update software S1 is downloaded into a first memory area M1 in a controller 2. An active/inactive switching portion 2-3 sets, as the current active/inactive switching state, the first memory area M1 as the active memory area and the second memory area M2 as the inactive memory area.

In this active/inactive switching state, the microprocessor 2-1 uses the pre-update software S1, which is stored in the first memory area (the active memory area) M1 to read in an input value (a measured value) through the lower-level-side communication interface 2-4, through a link module 5, from the field device 3, and to store the input value (measured value) in the field device read value buffer area 2-5, and also to calculate an actual value for the control output to the field device 3 from the input value that has been read in. Then the actual value for the control output, which has been calculated, is stored in the field device output value buffer area 2-8, and is sent to the field device 3 through the link module 5 through the lower-level-side communication interface 2-4.

In this way, the microprocessor 2-1 uses the pre-update software S1, which is stored in the active memory area M1 to control the operation of the field device 3.

Note that during control of the operation of the field device 3, the input value from the field device 3, which is held in the field device read value buffer area 2-5, and the actual value (output value) for the control output to the field device 2, which is held in the field device output value buffer area 2-8, may be referenced using an engineering tool or an operating screen of a monitoring portion 1-2 in the host computer.

Figure 2:
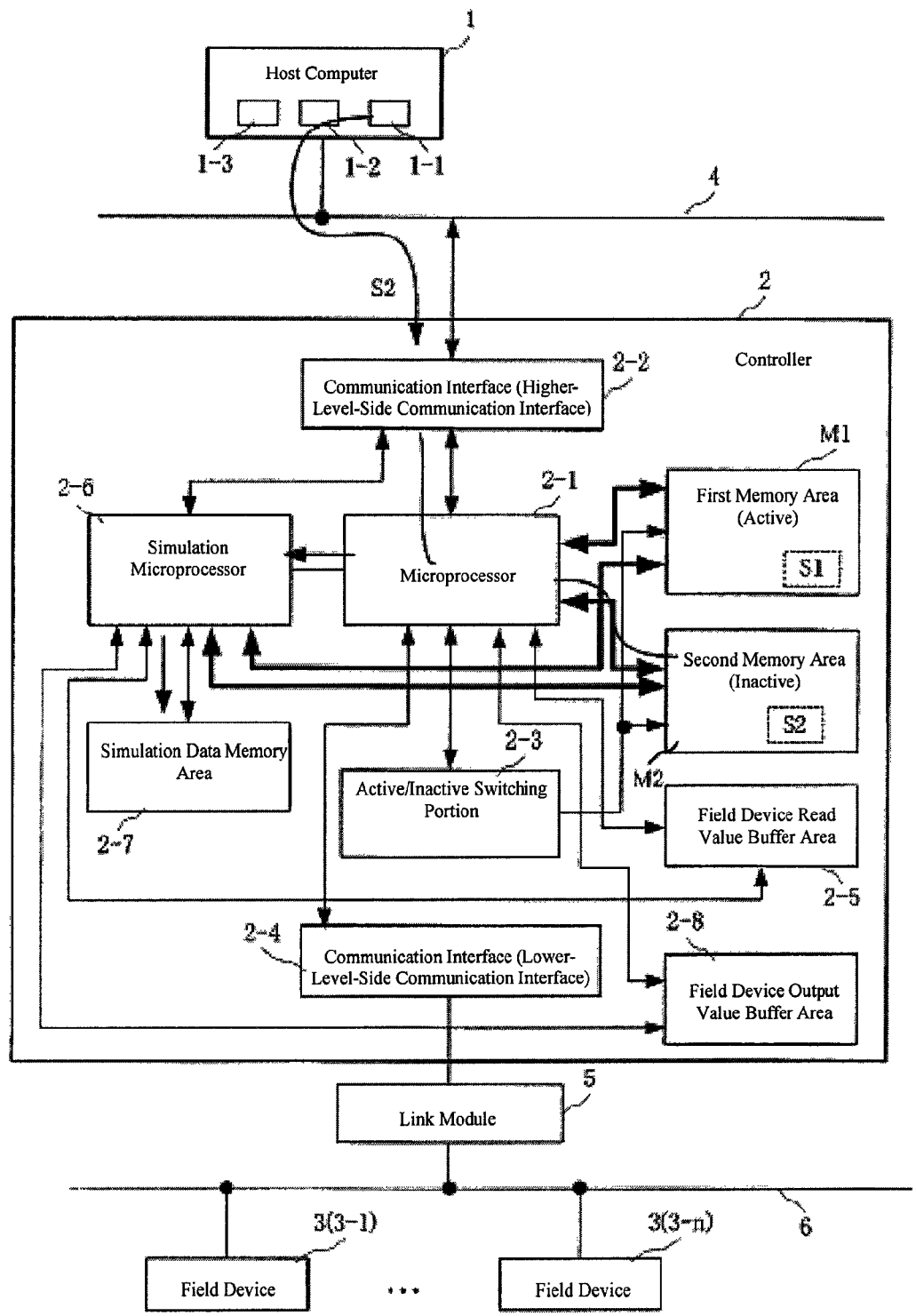
FIG. 2 is a diagram for explaining the state wherein updated software is downloaded to the controller in the field bus system.

When updating the software used by the controller 2, the updated software is sent from the host computer 1 to the controller 2 through the communication line 4, to be downloaded to the controller 2. In this case, the host computer 1 sends, to the controller 2, the updated software S2 through the updated software sending portion 1-1. (See FIG. 2.)

Figure 3:
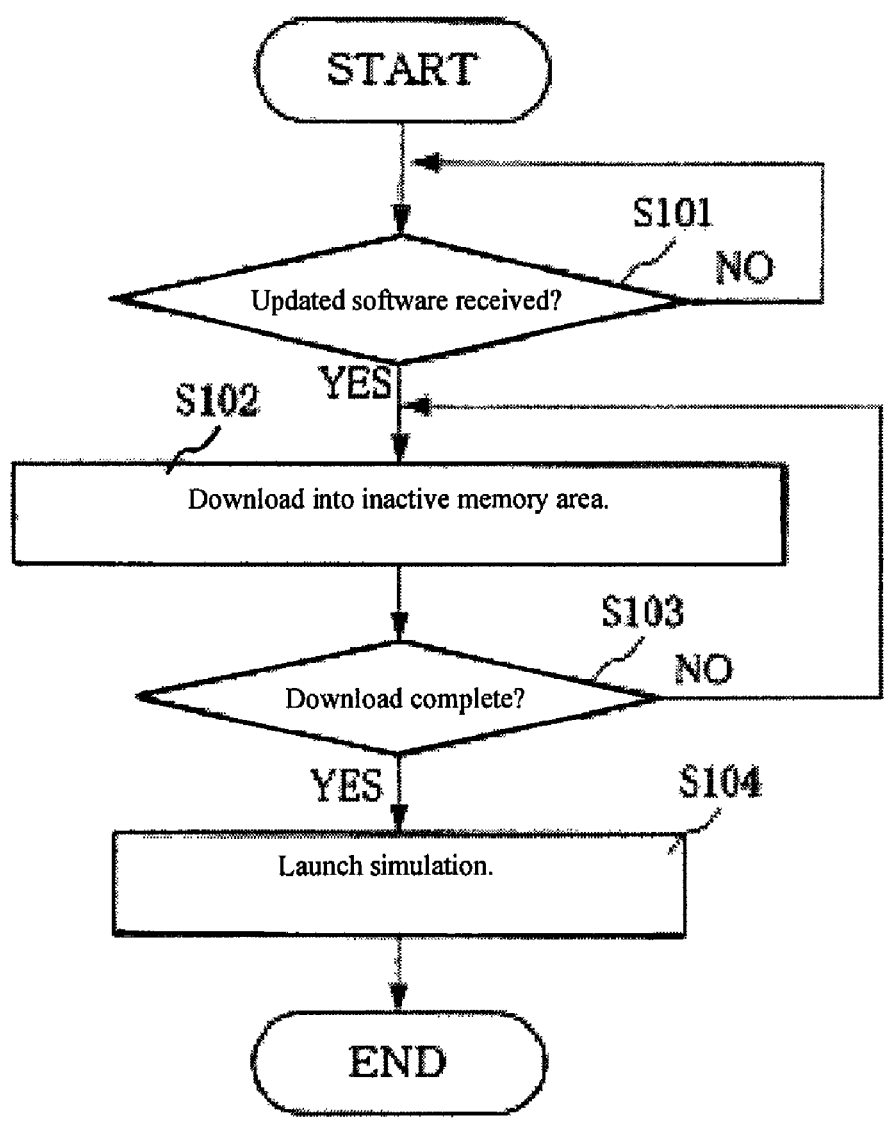
FIG. 3 is a flowchart illustrating the process when updated software is received by the controller in the field bus system.

In the controller 2, the updated software S2 from the host computer 2 is sent to the microprocessor 2-1 through the higher-level-side communication interface 2-102. The microprocessor 2-1, upon receipt of updated software S2 from the host computer 2 (YES in Step S101 in FIG. 3) downloads (Step S102), to the second memory area (the inactive memory area) M2, the updated software S2 that has been received. The downloading function for the updated software S2, possessed by the microprocessor 2-1, corresponds to the downloading means in the present invention.

The microprocessor 2-1, upon completion of the downloading of the updated software S2 to the inactive memory area M1 (YES in Step S103), commands the simulation microprocessor 2-6 to perform a simulation of the control of the field device 3 using the updated software S2 that has been downloaded (Step S104).

Figure 4:
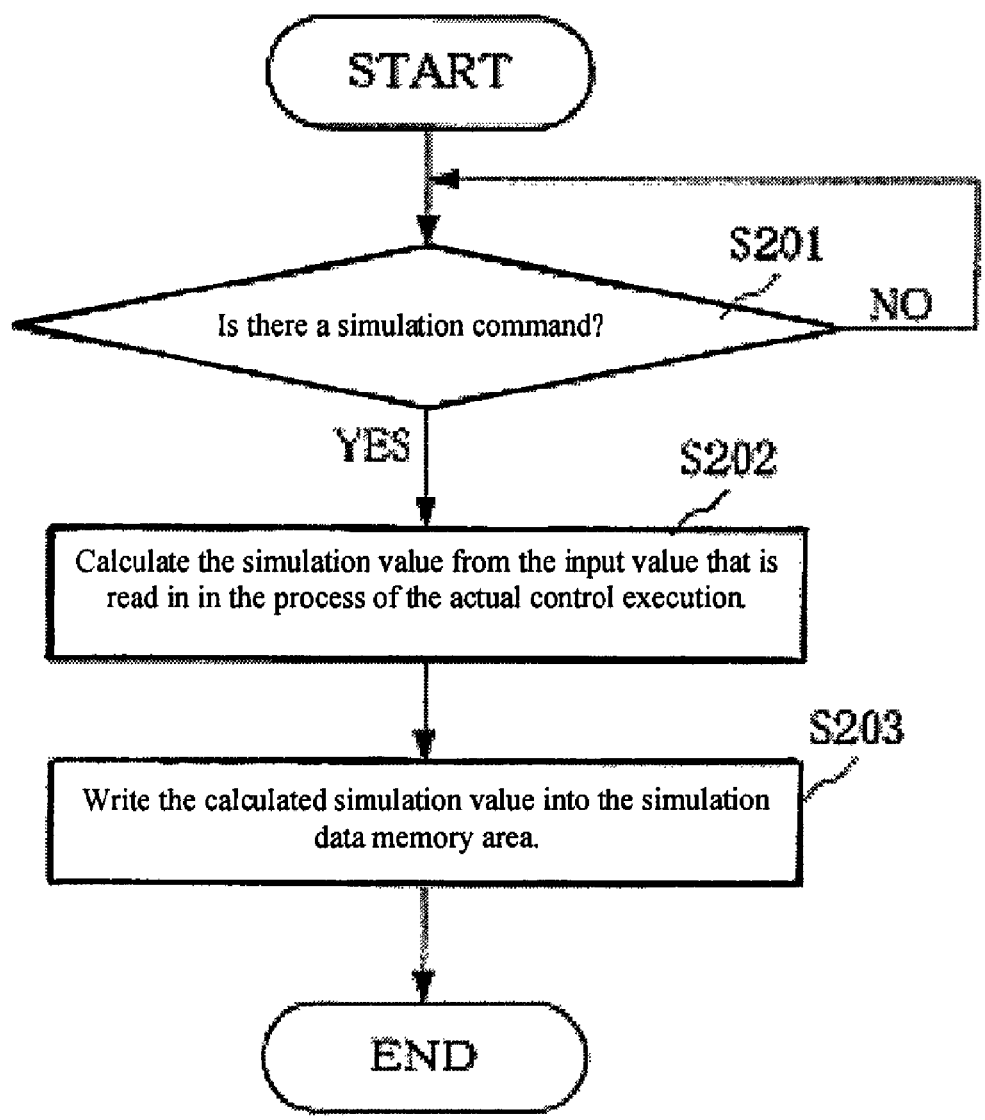
FIG. 4 is a flowchart illustrating the process at the time of the simulation using the updated software in the controller in the field bus system.

The simulation microprocessor 2-6, upon receipt of the simulation command from the microprocessor 2-1 (YES in Step S201 in FIG. 4), uses the updated software S2 within the inactive memory area M2 to calculate a simulation value for the control output to the field device 3 depending on the input value from the field device 3 (the input value that is read in the process of actual control execution) that is held in the field device read value buffer area 2-5 (Step S202), and writes this calculated simulation value to a simulation data memory area 2-7 (Step S203). In this case, the calculated simulation value for the control output is not sent through the lower-level-side communication interface 2-4 to the field device 3, but rather is only written to the simulation data memory area 2-7.

Note that the microprocessor 2-1 continues to control the operation of the field device 3 using the pre-update software S1, which is stored in the active memory M1, while downloading the updated software S2 to the inactive memory area M2, and while the simulation microprocessor 2-6 performs the simulation using the updated software S2. That is, the control of the operation of the field device 3 is continued using the software S1 that is stored in the active memory area M1 over the interval over which the first memory area M1 is the active memory area.

With the host computer 1, the operator is able to monitor the state of execution of the simulation using the updated software S2 in the controller 2.

Figure 5:
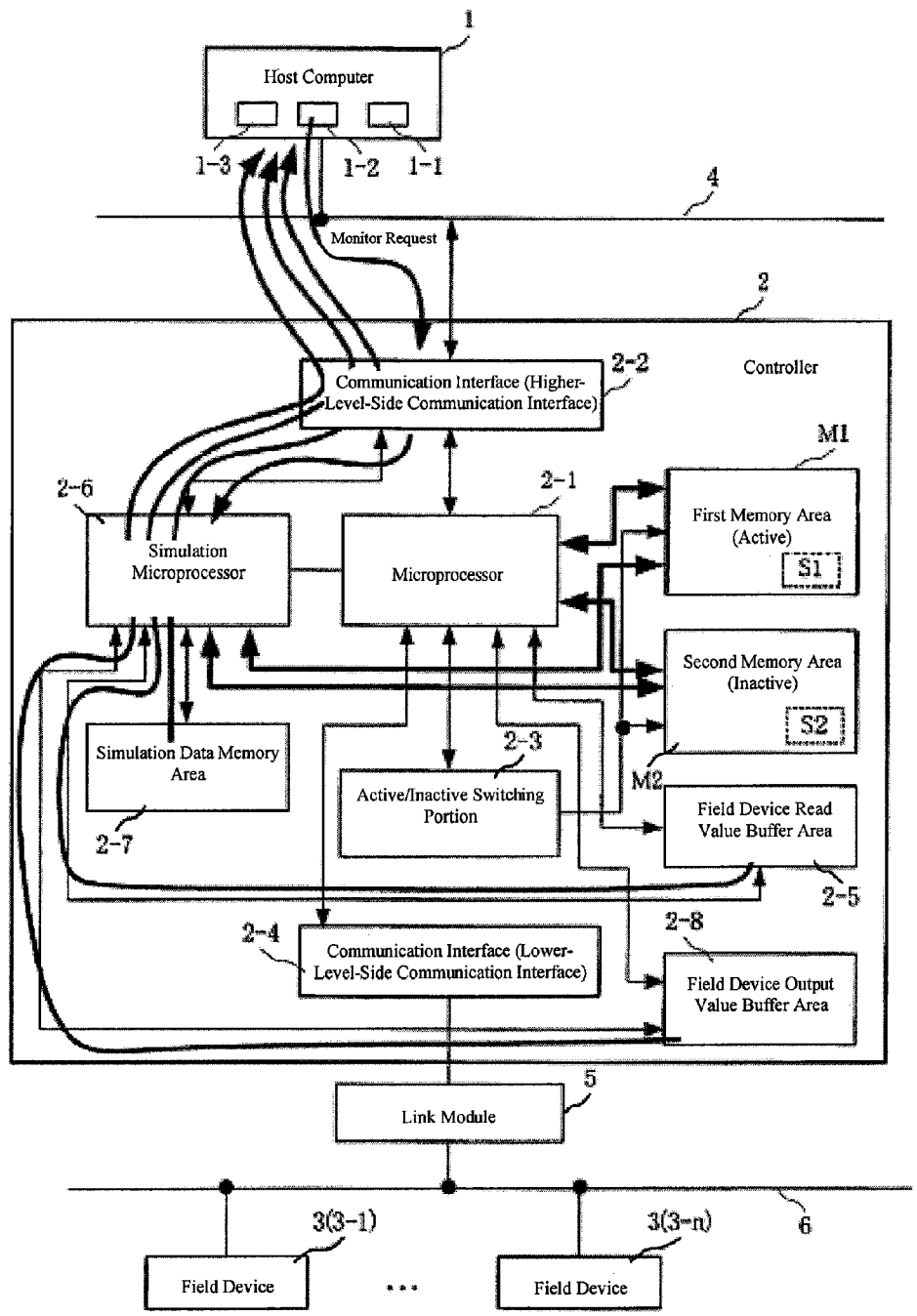
FIG. 5 is a diagram for explaining the state wherein monitoring of the state of execution of the simulation is performed by the host computer in the field bus system.

In this case, the operator uses the monitoring portion 1-2 of the host computer 1 to send, to the controller 2, a request for monitoring of the status of execution of the simulation using the updated software S2. (See FIG. 5.) This simulation execution status monitoring request is sent to the simulation microprocessor 2-6 of the controller 2.

Figure 6:
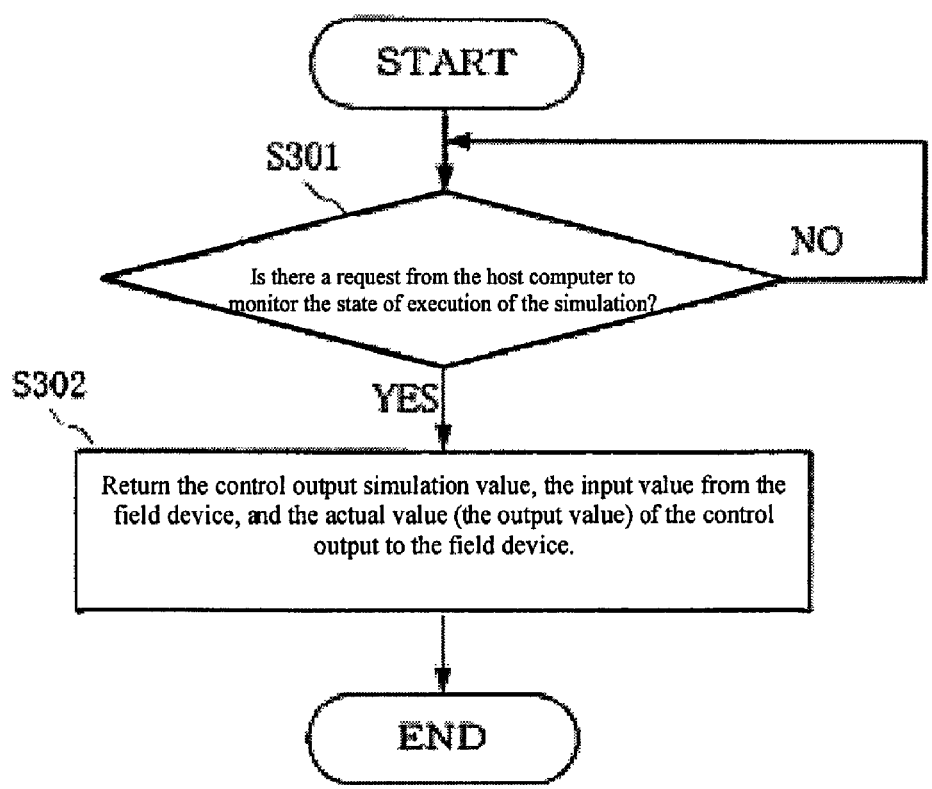
FIG. 6 is a flowchart illustrating the process in the controller when there is a monitoring request from the host computer for the state of execution of the simulation.

The simulation microprocessor 2-6, upon receipt of the simulation execution status monitoring request from the host computer 1 (Step S301 in FIG. 6), returns, to the host computer 1, the control output simulation value that is written to the simulation data memory area 2-7, the input value from the field device 3, which is stored in the field device read value buffer area 2-5, and the actual value (output value) of the control output to the field device 3, which is held in the field device output value buffer area 2-8 (Step S302).

In this host computer 1, the monitoring portion 1-2 compares the simulation value for the control output, sent from the controller 2, the input value from the field device 3, and the actual value (output value) of the control output to the field device 3, and displays on the operating screen.

Figure 7:
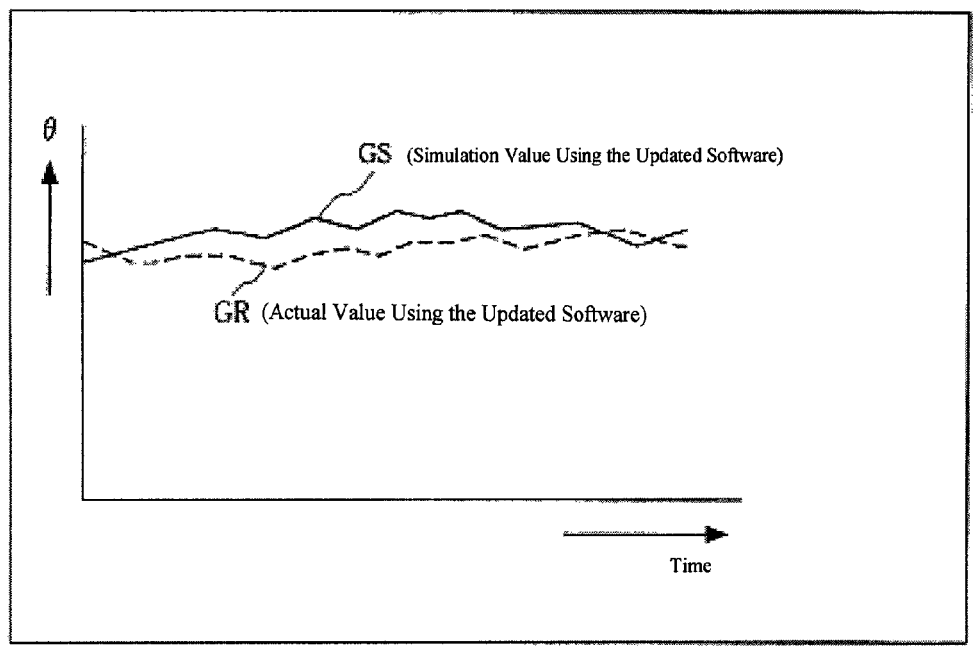
FIG. 7 is a diagram illustrating a trend graph shown on an operating screen of the host computer.

For example, if the field device 3 is a valve operating device and the control output is a valve opening of θ, then, as illustrated in FIG. 7, the trend graph GS of the control output simulation value and the trend graph GR of the actual values (output values) for the control output are displayed in a comparison.

In this case, the trend graph GS is the simulation values for the control outputs using the updated software S2, and the trend graph GR is the actual values (output values) for the control outputs using the pre-update software S1. By comparing these trend graphs GS and GR is possible to validate the validity of the updated software S2 that is downloaded to the controller 2.

Figure 8:
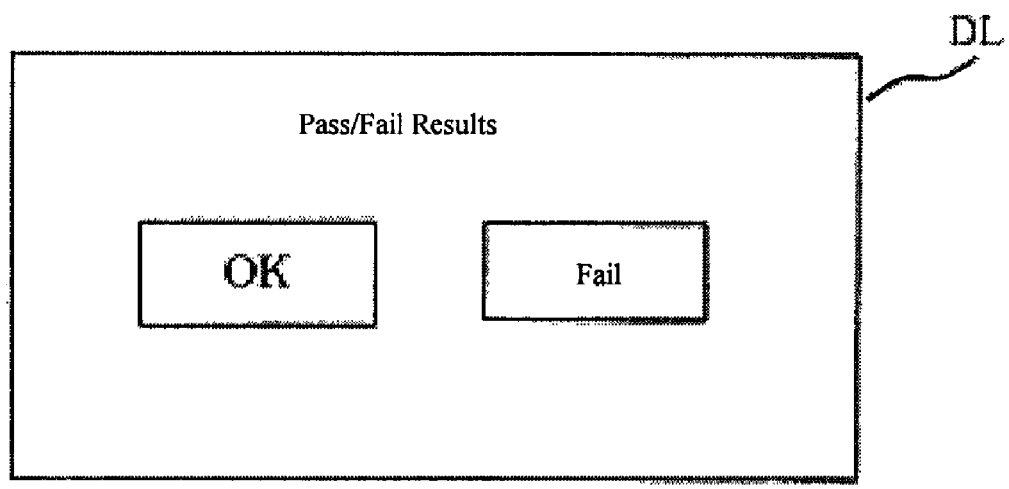
FIG. 8 is a diagram illustrating a dialogue displayed on the operating screen of the host computer.

Additionally, the monitoring portion 1-2 displays a dialog DL (illustrated in FIG. 8) asking for pass/fail evaluation results for the state of execution of the simulation using the updated software S2, in the operating screen wherein the trend graphs GS and GR are displayed.

Figure 9:
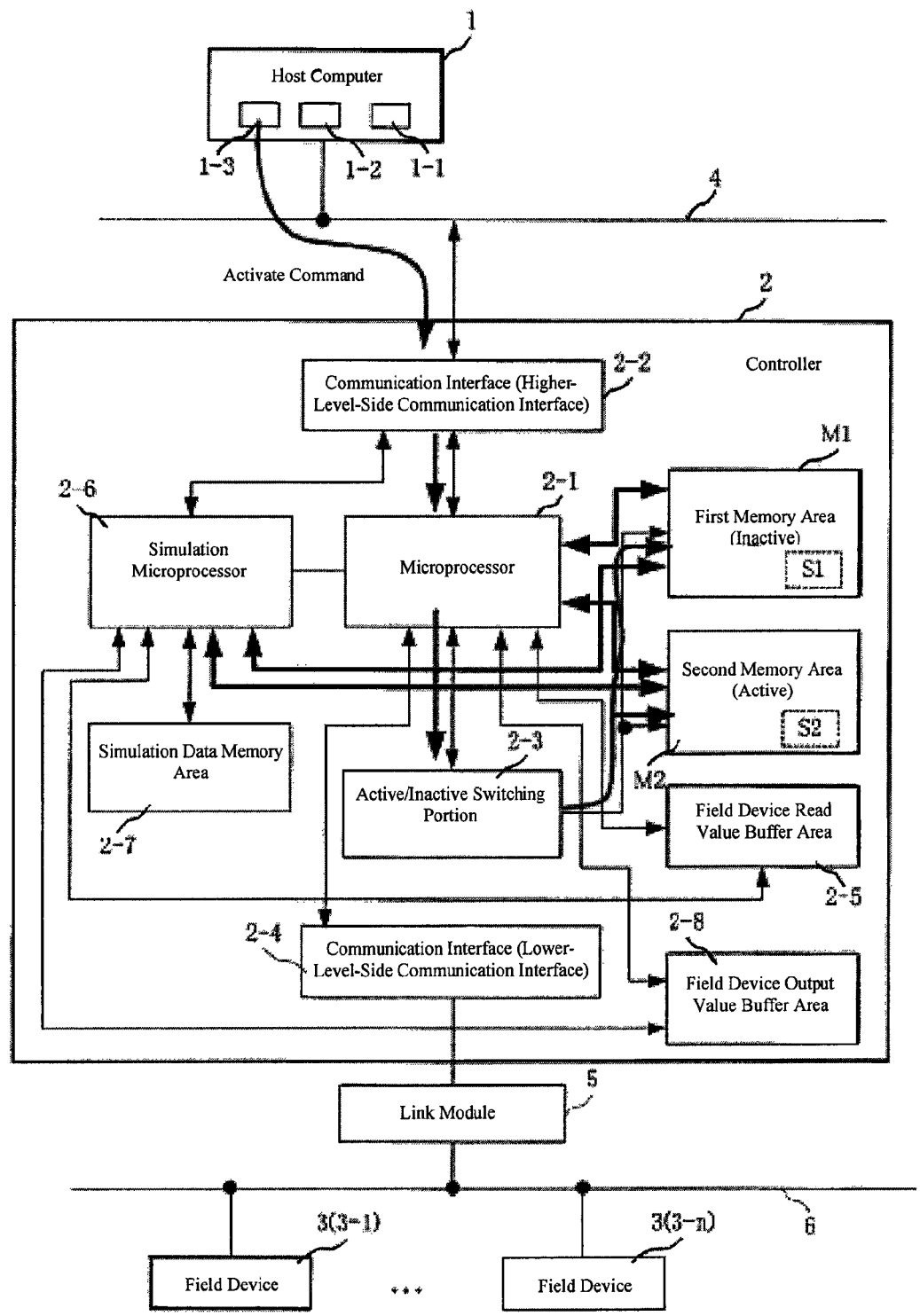
FIG. 9 is a diagram for explaining the state wherein the active/inactive switching is performed in the controller through an activate command from the host computer.

If the operator, as the result of the validation, determines that the updated software S2 that has been downloaded to the controller 2 is valid, the operator inputs the pass/fail evaluation result as "Okay (Pass)" from the dialogue DL. When this is done, an activate command is sent to the controller 2 from the activate command sending portion 1-3 of the host computer 1. (See FIG. 9.)

Figure 10:
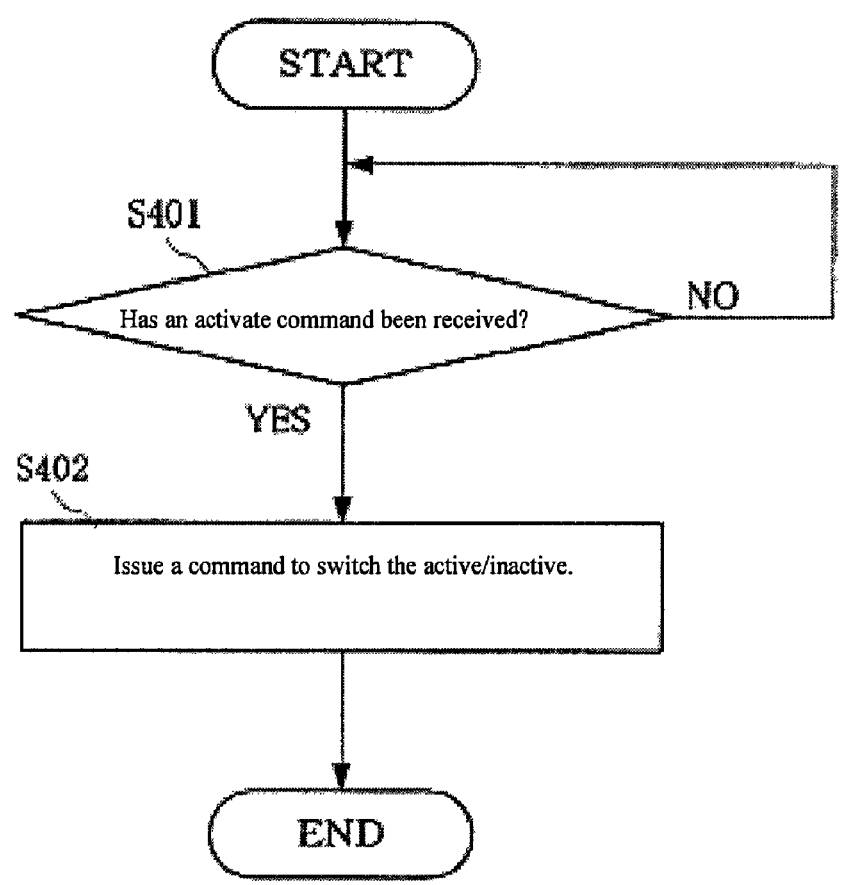
FIG. 10 is a flowchart illustrating the process in the controller when there is an activate command from the host computer.

In the controller 2, the activate command from the host computer 2 is sent through the higher-level-side communication interface 2-2 to the microprocessor 2-1. The microprocessor 2-1, upon receipt of the activate command from the host computer 2 (YES in Step S401 in FIG. 10) instructs the active/inactive switching portion 2-3 to perform the active/inactive switching (Step S402).

This causes the active/inactive switching portion 2-3 to switch the second memory area M2, which has been inactive, to be the active memory area, and to switch the first memory area M1, which has been active, to be the inactive memory area.

This causes the microprocessor 2-1 to stop controlling the operation of the field device 3 using the pre-update software S1, which is stored in the first memory area (the inactive memory area), and to start controlling the operation of the field device 3 using the updated software S2, which is stored in the second memory area (the active memory area) M2.

In this way, the present example makes it possible to validate, on the host computer 1 side, the validity of the updated software S2 that has been downloaded by the controller 2 prior to the active/inactive switching, making it possible to prevent the use of the updated software S2 on the controller 2 without validating the validity.

Note that while in the example set forth above, when the simulation was performed using the updated software S2, simulation values were calculated for the control outputs to the field device 3 through inputted values from the field device 3 that were stored in the field device read value buffer area 2-5, instead an operating mode and other set values may be sent from the host computer 18 and held in the simulation data memory area 2-7, and the simulation values for the control outputs to the field device 3 may be calculated based on the operating mode and other setting values sent from the host computer 1. In this case, the simulation values for the control outputs to the field device 3 that have been calculated and the operating mode and other setting values may be compared and displayed on the operating screen of the monitoring portion 1-2 on the host computer 1 side.

Additionally, in the example set forth above, the entirety of the updated software S2 was sent when the updated software S2 is downloaded from the host computer 1 to the controller 2; however, in a case wherein most of the detail of the updated software S2 is identical to the pre-update software S1, then a copy memory area command may be sent from the host computer 1, and the pre-update software S1 that is stored in the active memory area M1 may be copied to the inactive memory area M2, and the difference, only, may be sent to the controller 2 from the host computer 1, and then the pre-update software S1 in the inactive memory area M2 may be over-written by the updated software S2. Doing so makes it possible to reduce the communication load.

Additionally, while in the example set forth above the explanation was for downloading the updated software to a controller 2, the field device 3 may be configured identically to the controller 2, and updated software for the field device may be downloaded. In this case, the input value (the measured value) of the field device 3 itself may be held in the field device read buffer area 2-5, and the actual values (output values) of the operating output of the field device 3 itself may be held in the field device output value buffer area 2-8.

The field bus system according to the present invention may be used in a variety of fields, such as process control, as a field bus system for controlling, using a controller, a variety of field devices.

The invention claimed is:

1. A field bus system for downloading, from a host computer to a controller, software for controlling operation of a field device, comprising:
a host computer;
a controller that is connected through a communication line to the host computer; and
a field device controlled by the controller, wherein
the controller comprises:
first and second memory areas provided as memory areas for software installation;
an active/inactive switch configured to receive an activate command from the host computer to switch either the first or the second memory area to be an active memory area and to switch the other to be an inactive memory area;
a field device operation controller configured to control the operation of the field device using the software that is stored in the active memory area;
a downloading device configured to download, to the inactive memory area, updated software sent from the host computer; and
a simulator configured to perform a simulation of control of operation of the field device using the updated software that is downloaded into the inactive memory area,
the host computer comprises:
an updated software sender configured to send updated software to the controller;
a monitor configured to monitor a state of execution of the simulation using the updated software in the controller; and
an activate command sender configured to send an activate command to the controller,
the field device operation controller calculates an actual value for control output to the field device from an input value that is read in from the field device, using software that is stored in the active memory area, and
the simulator calculates a simulation value for the control output to the field device from an input value that is read in from the field device, using updated software that is downloaded to the inactive memory area.

2. A field bus system as set forth in claim 1, wherein:
the monitor compares and displays the actual value for the control output to the field device, calculated by the field device operation controller, and the simulation value for the control output to the field device, calculated by the simulator.

3. A field bus system for downloading, from a host computer to a controller, software for controlling operation of a field device, comprising:
a host computer;
a controller that is connected through a communication line to the host computer; and
a field device controlled by the controller, wherein
the controller comprises:
first and second memory areas provided as memory areas for software installation;
an active/inactive switch configured to receive an activate command from the host computer to switch either the first or the second memory area to be an active memory area and to switch the other to be an inactive memory area;
a field device operation controller configured to control the operation of the field device using the software that is stored in the active memory area;
a downloading device configured to download, to the inactive memory area, updated software sent from the host computer; and
a simulator configured to perform a simulation of control of operation of the field device using the updated software that is downloaded into the inactive memory area,
the host computer comprises:
an updated software sender configured to send updated software to the controller;
a monitor configured to monitor a state of execution of the simulation using the updated software in the controller; and
an activate command sender configured to send an activate command to the controller,
the field device operation controller calculates an actual value for control output to the field device from an input value that is read in from the field device, using software that is stored in the active memory area,
the simulator calculates a simulation value for the control output to the field device from an operating mode and other set values sent from the host computer, using updated software downloaded to the inactive memory area, and
the monitor displays the simulation value of the control output to the field device, calculated by the simulator.

4. A field bus system as set forth in claim 1, wherein:
the host computer comprises a dialogue display displaying a dialog querying pass/fail evaluation results for the state of the execution of the simulation being monitored; and
the activate command sender sending an activate command to the controller if the pass/fail evaluation results from the dialogue is inputted as "Pass."

5. A field bus system for downloading software from a host computer to a field device, comprising:
a host computer;
a controller that is connected through a communication line to the host computer; and
a field device controlled by the controller, wherein
the controller comprises:
first and second memory areas provided as memory areas for software installation;
an active/inactive switch configured to receive an activate command from the host computer to switch either the first or the second memory area to be an active memory area and to switch the other to be an inactive memory area;
a field device operator configure to operate the field device using the software that is stored in the active memory area;
a downloading device configured to download, to the inactive memory area, updated software sent from the host computer; and a simulator configured to perform a simulation of the operation of the field device using the updated software that is downloaded into the inactive memory area, the host computer comprises:

an updated software sender configured to send updated software to the field device;

a monitor configure to monitor a state of execution of the simulation using the updated software in the field device; and an activate command sender configured to send sending an activate command to the field device, the field device operator calculates an actual value for control output to the field device from an input value that is read in from the field device, using software that is stored in the active memory area, and the simulator calculates a simulation value for the control output to the field device from an input value that is read in from the field device, using updated software that is downloaded to the inactive memory area.

* * * * *